United States Patent [19]

Kikuchi

[11] Patent Number: 5,227,763
[45] Date of Patent: Jul. 13, 1993

[54] ANTI-DISASTER MONITORING SYSTEM

[75] Inventor: Masamichi Kikuchi, Kanagawa, Japan

[73] Assignee: Hochiki Kabushiki Kaisha, Tokyo, Japan

[21] Appl. No.: 755,176

[22] Filed: Sep. 5, 1991

[30] Foreign Application Priority Data

Sep. 6, 1990 [JP] Japan .................................. 2-236071

[51] Int. Cl.$^5$ ............................................. G08B 26/00
[52] U.S. Cl. ..................... 340/518; 340/505; 340/825.12
[58] Field of Search .................... 340/518, 505, 825.06, 340/825.07–825.12

[56] References Cited

U.S. PATENT DOCUMENTS

| | | | |
|---|---|---|---|
| 3,806,872 | 4/1974 | Odom | 340/825.12 |
| 4,586,040 | 4/1986 | Akiba et al. | 340/518 |
| 4,996,518 | 2/1991 | Takahashi et al. | 340/505 |
| 5,061,922 | 10/1991 | Nishijima et al. | 340/825.08 |
| 5,101,199 | 3/1992 | Suzuki | 340/825.08 |

Primary Examiner—Donnie L. Crosland
Attorney, Agent, or Firm—Lackenbach Siegel Marzullo & Aronson

[57] ABSTRACT

Disclosed is an anti-disaster system in which terminals are called by the polling system and in which the response signals from the terminals are received and decoded by a receiver to issue an alarming. Each of the terminals has an interrupt transmission section for transmitting an interrupt signal at a predetermined time during the receiver's transmission of the calling signal when an abnormality is detected. The receiver has an interrupt detection section for monitoring the predetermined time during the transmission of the calling signal to detect an interrupt signal from the terminal, and a calling control means for sequentially performing terminal group calling when the interrupt detection output is obtained from said interrupt signal detection section to specify the terminal in which abnormality data is detected. The receiver transmits a calling signal for interrupt confirmation to the terminals when it receives the interrupt detection output of the interrupt detection section to allow the terminal to transmit an interrupt response signal which indicates the cause of generation of the interrupt. The receiver transmits the calling signals in a voltage mode, and the terminals transmit the terminal response signals in a current mode. Since interrupt data is transmitted from the terminal using the predetermined time during the receiver's transmission of the calling signal, group calling can be performed without delay to specify the terminal in which an abnormality is detected. Consequently, the time required to make the abnormality determination can be shortened.

3 Claims, 13 Drawing Sheets

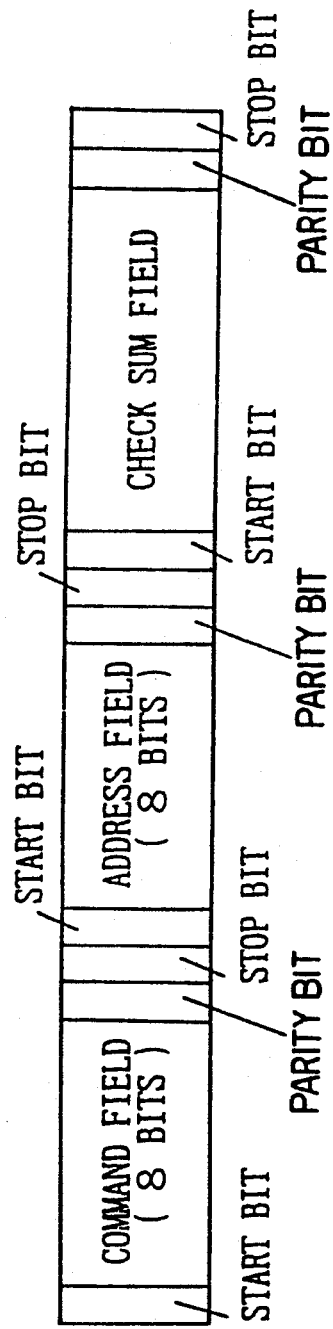
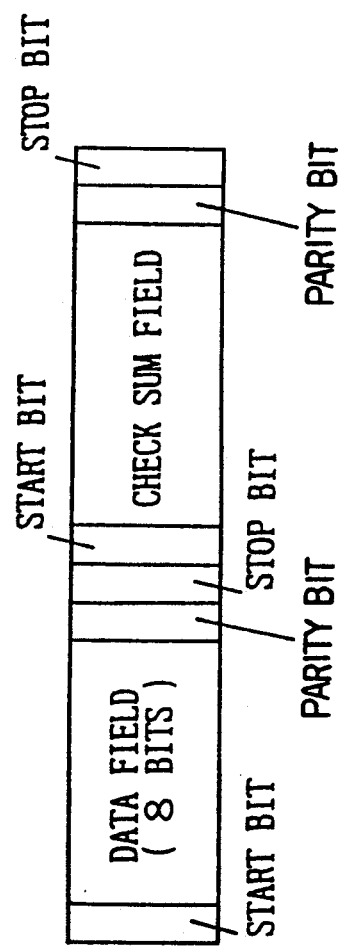
FIG. 4
FIG. 5

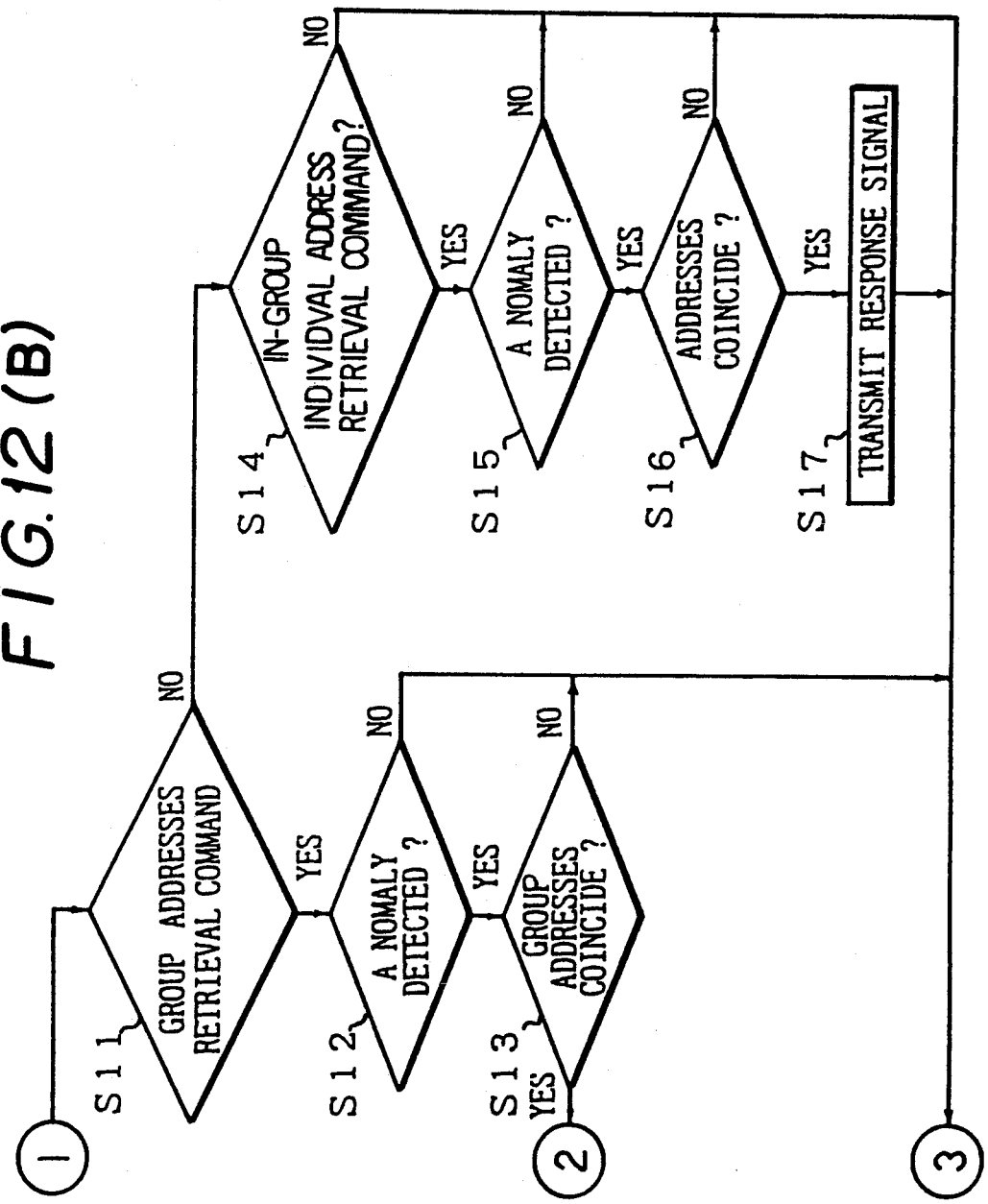

ANTI-DISASTER MONITORING SYSTEM

BACKGROUND OF THE INVENTION

1. Field of the Invention

The present invention relates to an anti-disaster monitoring system for monitoring abnormalities, such as fires, by receiving terminal information from fire sensors or the like by means of a receiver and by processing the received information. More particularly, the present invention pertains to an anti-disaster monitoring system in which terminal information is received from terminals which are called in sequence by a receiver which designates the address of the terminal and in which alarming or the like is performed on the basis of the received information.

2. Description of the Related Art

Conventional fire monitoring systems adopt polling in which a plurality of terminals are called in sequence by a receiver which designates the address of the terminal. That is, each of the plurality of terminals has an address which identifies that terminal. The receiver sequentially sends to the individual terminals a calling signal which designates the terminal's address. A terminal in which an abnormality, such as a fire, is detected, awaits the transmission of its address. When the address sent from the receiver coincides with the address of that terminal, the terminal transmits fire detection information or the like to the receiver during a response period which follows the call.

In such a conventional fire monitoring system which adopts the polling system, when there are few terminals, fire alarming can be made without delay. However, when the number of terminals is great, the time required to poll the terminals is proportional to the number of terminals and is thus longer. Therefore, after a fire is detected, determination and alarming of a fire by the receiver may be delayed.

When a fire transmitter is connected to a terminal, there is almost no possibility of false information.

However, in the conventional anti-disaster monitoring system of this type, operation of a fire transmitter is detected by polling, as in the aforementioned anti-disaster monitoring system, and then fire alarms are activated. As a result, after the fire transmitter is operated, activation of the alarm is delayed. This may make the fire informer (operator) anxious.

Particularly, in the case of the dual consecutive transmission collation system in which a fire is determined after fire detection information is received twice in sequence, since response signals received by the two callings are collated, activation of a fire alarm is further delayed.

SUMMARY OF THE INVENTION

In view of the aforementioned problems of the conventional systems, an object of the present invention is to provide an anti-disaster monitoring system which is capable of receiving terminal information quickly independently of sequential calling when urgent information is detected at a terminal so as to perform determination of generation of an abnormality.

To achieve this object, the present invention provides an anti-disaster monitoring system in which a plurality of terminals 12 is connected to a receiver 10 through a transmission path 14, in which the receiver 10 calls the terminals 12 in sequence by transmitting calling signals each of which designates the address of the terminal, in which the terminal 12 transmits a terminal response signal when the calling address coincides with a self address of the terminal, and in which the receiver 10 decodes the received terminal response signal and performs alarming or the like.

In the anti-disaster monitoring system according to the present invention, each of the terminals 12 has an interrupt transmission section 16 for transmitting an interrupt signal at a predetermined time during the receiver's transmission of the calling signal when an abnormality is detected. The receiver 10 has an interrupt detection section 18 for monitoring the predetermined time during the transmission of the calling signal to detect an interrupt signal from the terminal 12, and a calling control means 20 for sequentially performing group calling on the terminals 12 when the interrupt detection output is obtained from the interrupt signal detection section 18 to specify the terminal in which abnormality data is detected.

The receiver 10 transmits a calling signal for interrupt confirmation to the terminals 12 when it receives the interrupt detection output of the interrupt detection section 18 to allow the terminal 12 to transmit an interrupt response signal which indicates the cause of generation of the interrupt.

The receiver 10 transmits the calling signals in a voltage mode, and the terminals 12 transmit the terminal response signals in a current mode. The terminal response signals can be transmitted in a state in which they are superimposed on the calling signals.

In the anti-disaster monitoring system according to the present invention, when urgent terminal data, such as a fire or a gas leakage, is detected in a particular terminal, that terminal transmits an interrupt signal using a predetermined time during the receiver's transmission of the calling signal. This allows the receiver to quickly execute the group calling process to specify the terminal in which the abnormality is detected on the basis of the interrupt signal. As a result, the processing time required for the receiver to make a determination after an abnormality is detected in a terminal can be shortened.

Furthermore, when an interrupt is detected, an interrupt confirmation request is made to allow the terminal to return the detailed data indicating the cause of generation of the interrupt, i.e., to allow the terminal to inform whether the cause of generation of the interrupt is the operation of a fire transmitter or a fire detection signal from a fire sensor. Consequently, it is possible to take adequate measures corresponding to the detected abnormality.

When the cause of an interrupt is, for example, the detection data of a fire transmitter, fire alarms are activated first, and then a terminal in which an abnormality is detected is specified by group calling. Therefore, fire alarms are activated immediately after the fire transmitter is operated. This does not make the operator anxious.

Furthermore, since the interrupt data is transmitted in a current mode at a time when the calling signal is transmitted in a voltage mode, it is not necessary for the interrupt time to be provided separately from the transmission of the calling signal. This enables reduction in a polling period.

BRIEF DESCRIPTION OF THE DRAWINGS

FIG. 4 illustrates the format of a calling signal used in the present invention;

FIG. 5 illustrates the format of a response signal used in the present invention;

FIGS. 12(A) and 12(B) are flowcharts showing the terminal control process in the present invention.

DETAILED DESCRIPTION OF THE PREFERRED EMBODIMENTS

Figure 1:
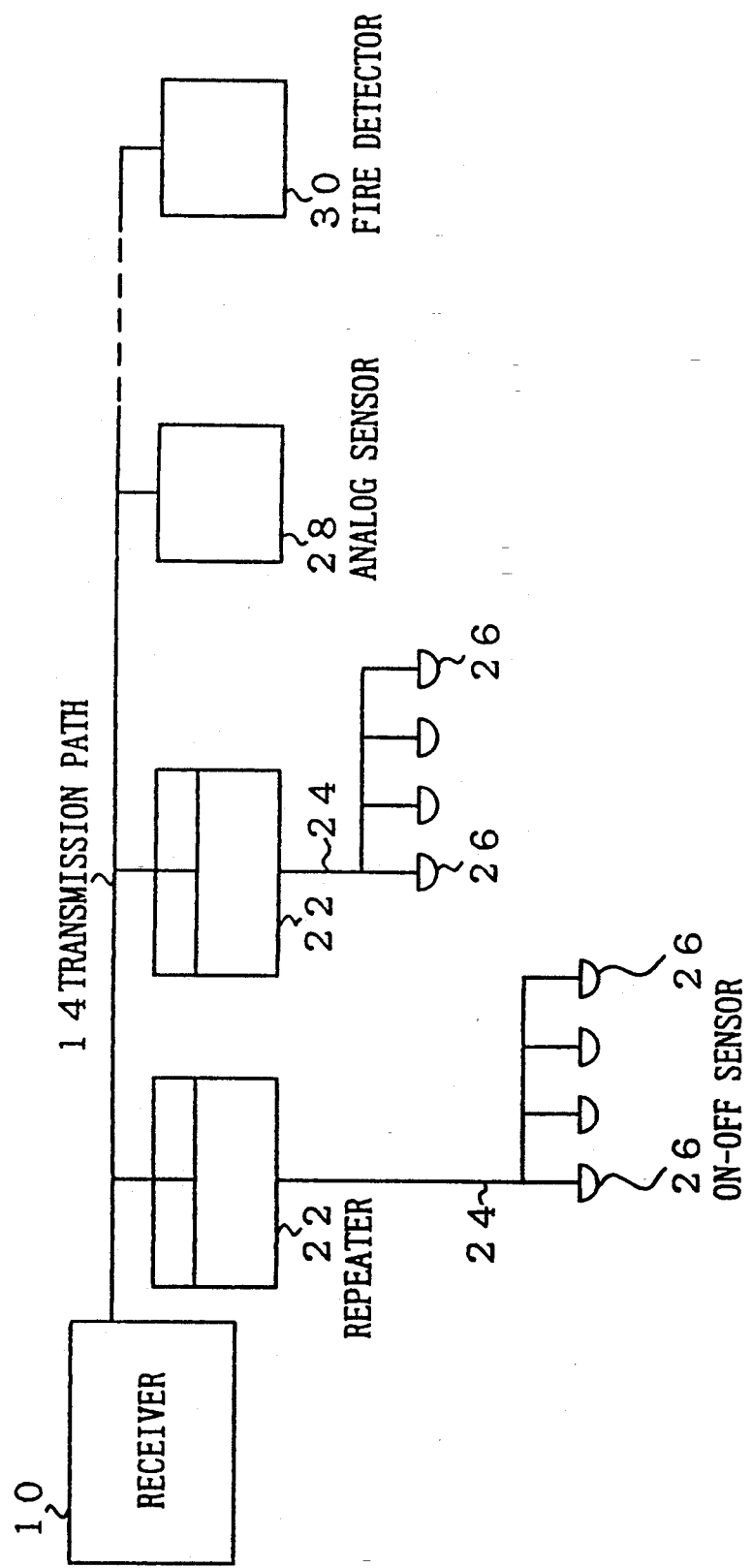
FIG. 1 shows the configuration of the present invention.

FIG. 1 shows the configuration of an anti-disaster monitoring system according to the present invention. The anti-disaster monitoring system shown in FIG. 1 includes a receiver 10, a transmission path 14 drawn from the receiver 10, and terminals, such as relaying devices 22, an analog sensor 28 and a fire transmitter 30, connected to the transmission path 14. Each of the terminals has an inherent address. A power source/signal line 24 is drawn from each of the relaying devices 22, and on-off sensors 26 are connected to the power source/signal line 24. The receiver 10 sends out call signals and thereby designates the addresses of the individual terminals, including the relaying devices 22, the analog sensor 28 and the fire transmitter 30, in sequence. The anti-disaster monitoring system according to the present invention adopts the polling system. Therefore, a terminal sends out a response signal representing the terminal detection information obtained at that time when it receives the call signal and the received address coincides with the address of that terminal. This invention is characterized in that an interrupt signal is sent out from the terminal in which an urgent abnormality is detected to the receiver 10 during the polling operation to inform generation of an abnormality.

Figure 2:
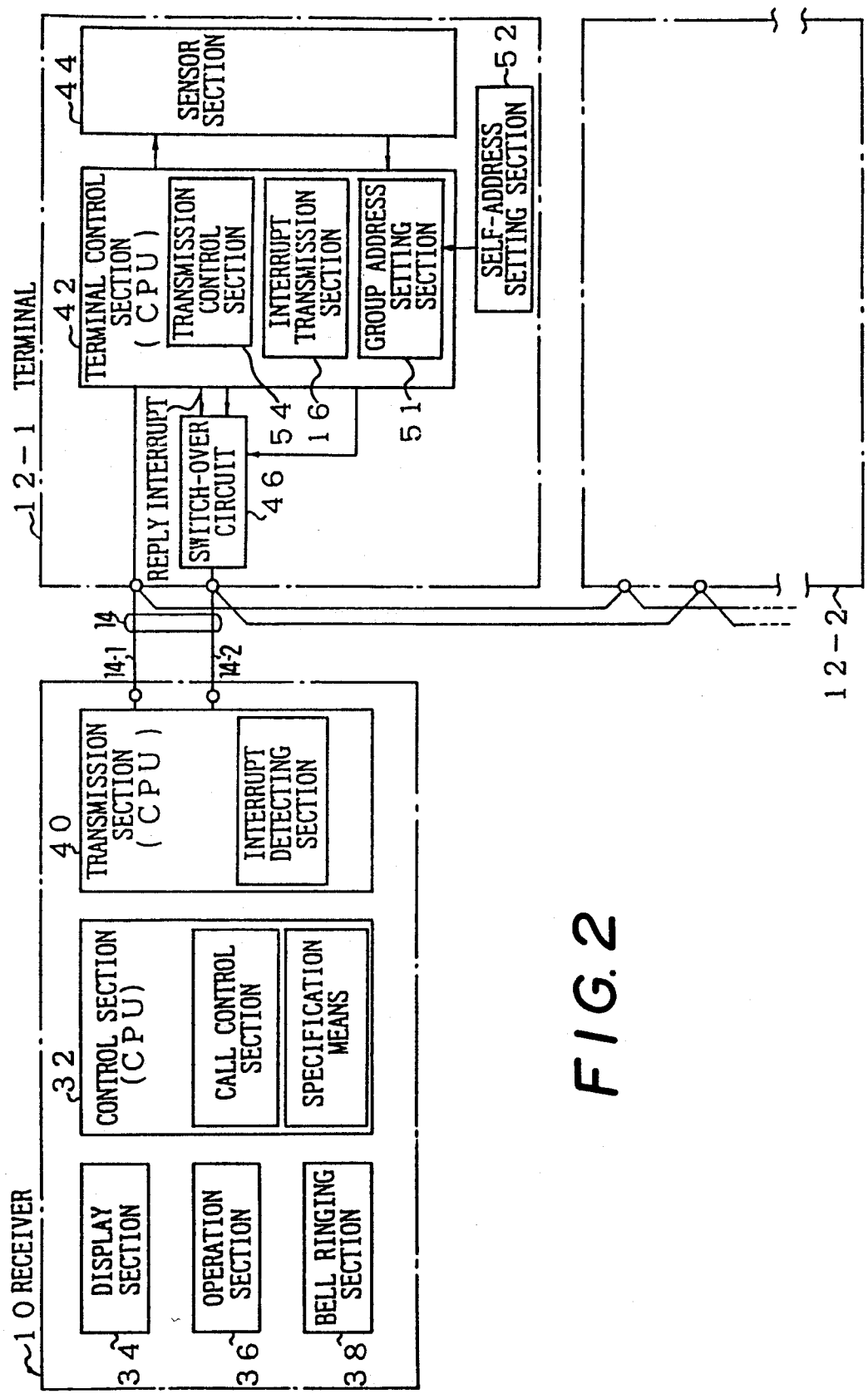
FIG. 2 shows the structure of an embodiment of the present invention.

FIG. 2 shows an embodiment of the present invention.

In the embodiment shown in FIG. 2, a plurality of terminals 12-1, 12-2, ... are connected to the transmission path 14 drawn from the receiver 10. The transmission path 14 is virtually divided into a calling line 14-1 and a response line 14-2. That is, in the embodiment of the present invention, a calling signal is transmitted from the receiver 10 to the terminal via the calling line 14-1 in the voltage mode, and a response signal is transmitted from the terminal to the receiver 10 via the response line 14-2 in the current mode. Therefore, the calling signal transmitted in the voltage mode can virtually be indicated as the calling line 14-1 separately from the response line 14-2.

In the receiver 10, a control section 32 which is constituted by a central processing unit is connected to a display section 34, an operation section 36 and a bell activating section 38. Also, a transmission section 40 constituted by a central processing unit is provided between the control section 32 and the transmission path 14. Both the control section 32 and the transmission section 40 may be formed by a single central processing unit.

Each of the terminals 12-1, 12-2, ... includes a terminal control section 42 which is constituted by a central processing unit, a sensor section 44, and a switch-over circuit 46. The sensor section 44 is the detection section of each of the on-off sensors 26, the analog sensor 28 and the fire transmitter 30 shown in FIG. 1, which outputs to the terminal control section 42 a fire detection signal on the basis of the detection principle or operation inherent therein.

In the present invention, the terminal control section 42 contains an interrupt transmission section 16 which is achieved by the program control of the central processing unit. When the interrupt transmission section 16 receives an abnormality detection output, such as a fire detection output or a gas leakage detection output, from the sensor section 44, it sends out through the switch-over circuit 46 an interrupt signal to the receiver 10. The switch-over circuit 46 switches over a response signal sent in response to the calling signal from the receiver and an interrupt signal sent by the interrupt transmission section 16. The interrupt signal is transmitted from the interrupt transmission section 16 in a state in which the response signal is superimposed on the interrupt signal at predetermined times during the receiver's transmission of the calling signals. That is, the interrupt signal is transmitted to the receiver 10 from the terminal using the response line 14-2 while the calling signals are transmitted from the receiver 10 using the calling line 14-1.

The terminal control section 42 also includes a group address setting section 51, which is connected to a self-address setting section 52 formed by a DIP switch or the like. The self address of the terminal is determined by operating the DIP switch of the self-address setting section 52. The group address setting section 51 determines a group address corresponding to the self-address.

In the receiver 10, the transmission section 40 includes an interrupt detection section 18 which monitors signals sent from the response line 14-2 at predetermined times during the transmission of the calling signals to the terminals. The interrupt detection section 18 generates an interrupt detection output to the control section 32 when it detects an interrupt signal. The control section 32 includes a call controlling section 20 which is achieved by the program control of the central processing unit. In the normal monitoring state, the calling control section 20 sends out calling signals each of which consists of a calling command and a calling address of each terminal. The control section 32 also includes a specification means 53 for specifying the terminal in which an abnormality is detected by the group retrieval or in-group separate address retrieval.

When the receiver 10 receives an interruption detection output from the transmission section 40, it sends out to the terminals a calling signal containing an interrupt confirmation command. When the receiver 10 receives from the terminal detailed information indicating the cause of the interrupt, i.e., an interrupt confirmation signal, it decodes the cause of the interrupt, and executes the corresponding processing. In this embodiment, there are three interruption levels, from level 1 to level 3. That is, the interrupt level 1 represents the fire detection output of the fire transmitter, the interrupt level 2 indicates the detection output of the fire sensor or gas leakage sensor, and the interrupt level 3 indicates that the analog detection signal of the analog sensor has exceeds a pre-alarming level at which the fire determination is started at the receiver end. The interrupt levels 1 to 3 also indicate the order of priority of interrupts. When two or more interrupt confirmation information having different levels are received at the same time, priority is given to the interrupt level having a higher order of priority. That is, if interrupt levels 1 and 2 are received at the same time, the interrupt level 1 is processed first.

Figure 3:
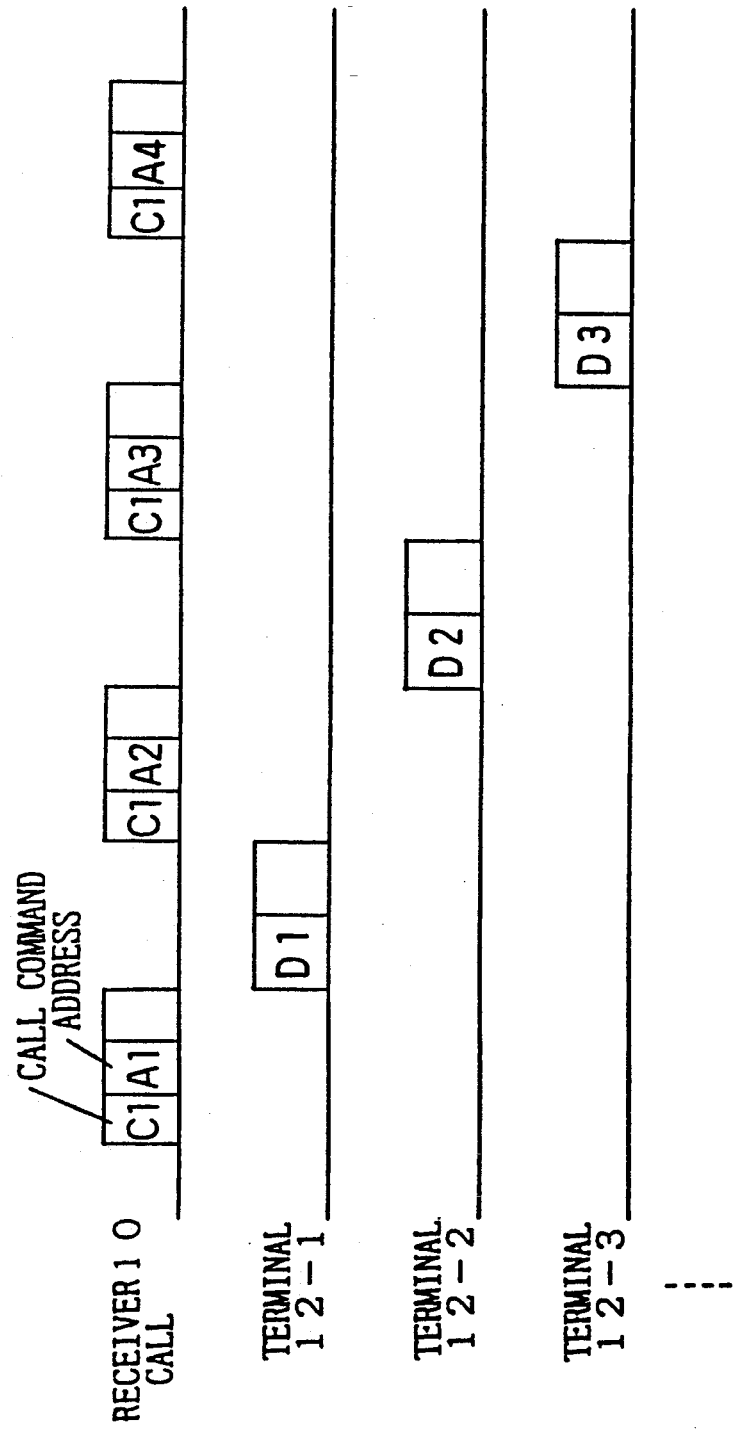
FIG. 3 is a timing chart of the calling and response processes executed in a normal monitoring state in the present invention.

FIG. 3 is a timing chart of the calling and response processes executed in a normal monitoring state in the embodiment shown in FIG. 2.

In FIG. 3, the receiver 10 sequentially sends out calling signals each of which contains a calling command C1 and a terminal address A1, A2, A3, A4 . . . .

Figure 6:
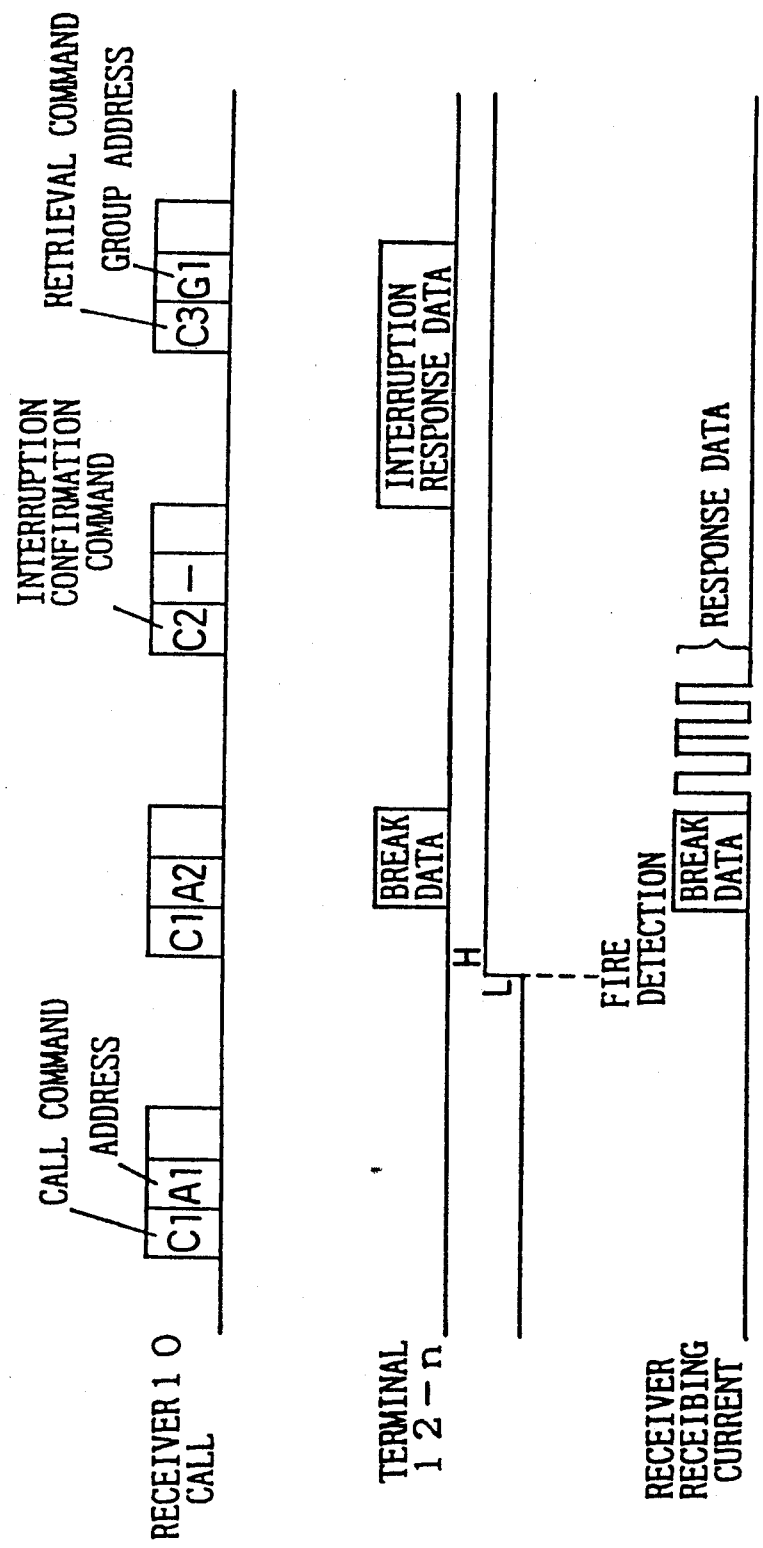
FIG. 6 is a timing chart of the calling and response processes executed when a fire is detected in the present invention.

As shown in FIG. 4, the calling signal consists of an 8-bit command field, an 8-bit address field and a 8-bit check sum field. The individual bytes are separated from each other by start, parity and stop bits. The command field is used to indicate to all the terminals what the calling signal from the receiver 10 indicates regardless of the address. In this case, upper 4 bits in the 8 bits indicate the type of a command, and lower 4 bits are allocated to a binary code representing the contents of the command. In a practical operation, the calling command shown in FIG. 3, an interrupt confirmation command C2 and a retrieval command C3, which will be described later with reference to FIG. 6, are used. A command data representing activation of fire alarms may also be used.

Turning to FIG. 3 again, when the address contained in the calling signal from the receiver 10 coincides with the address of a terminal, that terminal sends out a terminal response signal. The terminals 12-1, 12-2, 12-3, . . . therefore send out the terminal response signals in sequence.

As shown in FIG. 5, the terminal response signal consists of an 8-bit data field and 8-bit check sum field. A start bit indicates the beginning of each byte, and a parity and a stop bit occurs at the end of each byte.

In the normal monitoring state, the data D1, D2, D3, . . . in the terminal response signals shown in FIG. 4 represents the state of that terminal in the normal monitoring state.

FIG. 6 is a timing chart of the calling and response processes executed when a fire, e.g., an output of the fire transmitter, is detected in the terminal 12-n in the embodiment shown in FIG. 2.

In FIG. 6, when a fire is detected in the terminal 12-n by switching on the fire transmitter, the terminal 12-n sends out interrupt data at a time when a calling signal sent out from the receiver 10 first after the detection of the fire, that is, a calling signal having a calling command C1 and an address A2, is send out. That is, the terminal 12-n in which a fire is detected sends out interrupt data using the time period in which the second byte, the address field, and the third byte, the check sum field, in the calling signal are transmitted. 2-byte data consisting of pulses having only the logical high levels may be used as the interrupt data so that it can be discriminated from normal terminal response signals.

Interrupt data from the terminal 12-n is transmitted in response to the calling signal having the calling command C1 alone. That is, transmission of the interrupt data is not performed in response to other commands, such as an interrupt confirmation command C2.

When the receiver 10 detects this interrupt data sent from the terminal 12-n, it sends out to the terminals a subsequent calling signal in which an interrupt confirmation command C2 is set in the command field of the calling signal in place of the calling command C1. The interrupt confirmation command C2 is received by all the terminals 12-1 to 12-n. At that time, the terminal 12-n in which a fire is detected transmits interrupt response data as a terminal response signal on the basis of the interrupt confirmation command. The interrupt response data indicates the cause of generation of the interrupt. In the case shown in FIG. 6, interrupt response data having the interrupt level 1, indicating the fire detection output of the fire transmitter, is transmitted.

If the cause of generation of the interrupt is the detection output of the fire sensor or gas sensor, interrupt response data having the interrupt level 2 is transmitted. If the detection output of the analog sensor has exceeded the pre-alarming level, interrupt response data having the interrupt level 3 is transmitted.

When the receiver 10 receives the interrupt response data from the terminal 12-n, it decodes the interrupt response data and performs the corresponding processing. That is, if the interrupt level 1, indicating the fire detection output of the fire transmitter, is received, the receiver 10 activates the fire alarms, and then executes group calling process to specify the abnormality detecting terminal. If the interrupt level 2 or 3 is detected, the receiver immediately executes the group calling process to specify the abnormality detecting terminal without activating the fire alarms.

In the group calling process executed after the cause of the interrupt is clarified from the received interrupt response data, calling signals, in each of which a retrieval command C3 is set in the command field and a group address G1, G2, G3, . . . is set in the address field, are sequentially transmitted.

In one example of the group calling process, the terminals 12-1 to 12-n are divided into groups each of which consists of, for example, 8 terminals. Each group has a group address, G1, G2, G3, . . . inherent therein. In this example, group calling is performed by sequentially designating the group addresses. When the group address of the group containing the terminal 12-n from which break data is transmitted is designated in the group calling, a group response, indicating that that terminal exists in the group, is received, and the receiver recognizes that the group from which group response is received is the abnormality detecting group. Thereafter, the receiver specifies the terminal in that group in which the abnormality is detected by sequentially designating the separate addresses of the terminals.

Figure 7:
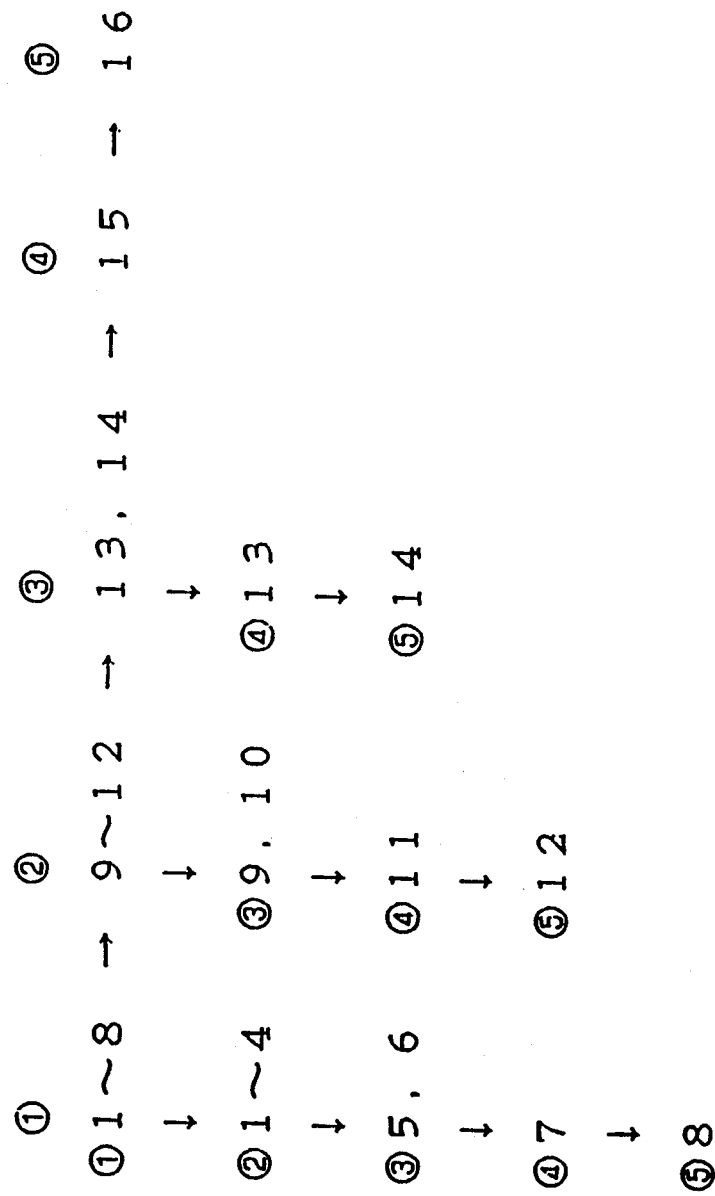
FIG. 7 illustrates the dichotomy method used in the group retrieval in the present invention.

Group calling may also be performed by the dichotomy shown in FIG. 7.

In the example shown in FIG. 7, group calling is performed on 16 terminals. 16 terminals respectively have addresses 1 to 16. In the dichotomy method, the number of terminals to be called is reduced first from 16 to 8, then from 8 to 4, 4 to 2 and then 2 to 1 in sequence to specify the terminal in which an abnormality is detected.

First, a group consisting of the terminal addresses, for example, 1 to 8 is called, as indicated by (1) in FIG. 7. If a response is received from that group, the flow proceeds downward, and a group consisting of the terminal addresses 1 to 4 is called, as indicated by (2). If a response is not received from that group, the terminal addresses 5 and 6 are called, as indicated by (3). If a response is not received from that group, the terminal address 7 is called, as indicated by (4). If a response is not received from the terminal address 7, the terminal address 8 is called, as indicated by (5). If the terminal address 8 is a terminal in which the abnormality is detected, calling has been made five times.

If a response is not received when the group consisting of the addresses 1 to 8 is called in (1), the flow proceeds sideways, and a group consisting of 4 terminals having addresses 9 to 12 is called, as indicated by (2). If a response is not received from that group, a group consisting of the terminal addresses 13 and 14 is called, as indicated by (3). Thereafter, the terminal addresses 15 and 16 are sequentially called, as indicated by (4) and (5).

In the group calling process by the dichotomy method, when the number of terminals is 16, the terminal in which an abnormality is detected can be specified by performing group calling over five stages at maximum.

Figure 8:
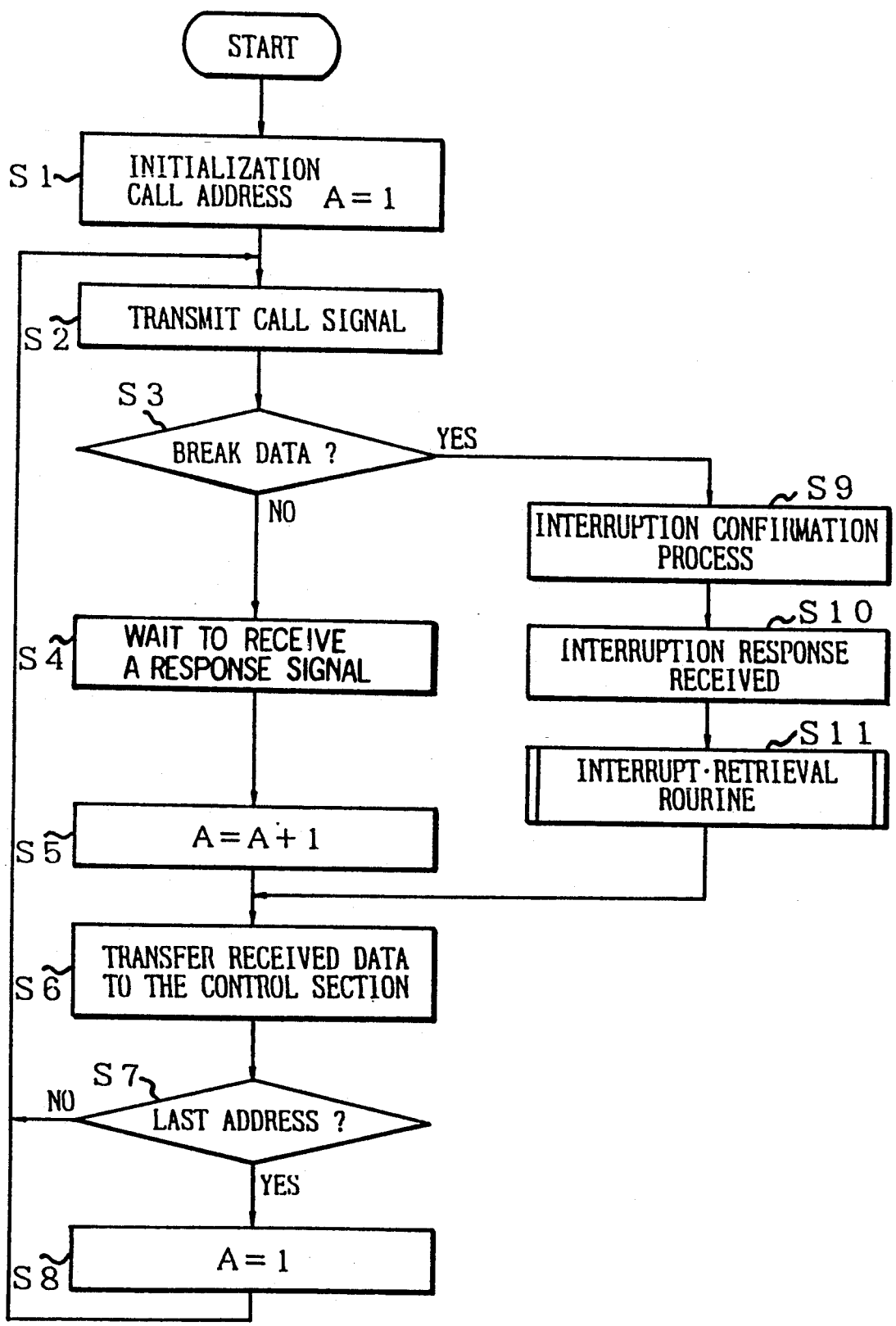
FIG. 8 is a flowchart showing the receiver control process in the present invention.

The control processings executed by the receiver shown in FIG. 2 will be described with reference to FIGS. 8 and 9.

In the flowchart shown in FIG. 8, when the receiver is turned on, initialization is conducted in step S1 (hereinafter, "step" is omitted), and 1 is set in the calling address A, i.e., A=1. Next, a calling signal consisting of the calling command C1 and the initial address 1 is transmitted in S2, and then it is determined in S3 whether or not interrupt data is received on a timing when the address field and check sum field in a calling signal are transmitted. If interrupt data is not received, the process goes to S4 and receiving of a response signal is awaited. If a response signal is received, the calling address A is incremented in S5, and the received data is transferred to the control section 32 in S6 so that necessary processing can be done. Subsequently, it is determined in S7 whether or not the address A is the last address. If the address A is not the last address, the process returns to S2. If the last address is set as the address A, the address A is initialized to 1 in S8, and then the process returns to S2.

If it is determined in S3 that interrupt data is received on a timing when the address and check sum fields of a calling signal are transmitted, the process goes to S9, and the receiver sends out a calling signal having an interrupt confirmation command C2 to the terminals. When interrupt response data is received from the terminal from which the interrupt signal is sent out in response to the interrupt confirmation command in S10, the interrupt/retrieval routine is executed in S11. The interrupt/retrieval routine is shown in FIG. 9 as a subroutine.

Figure 9:
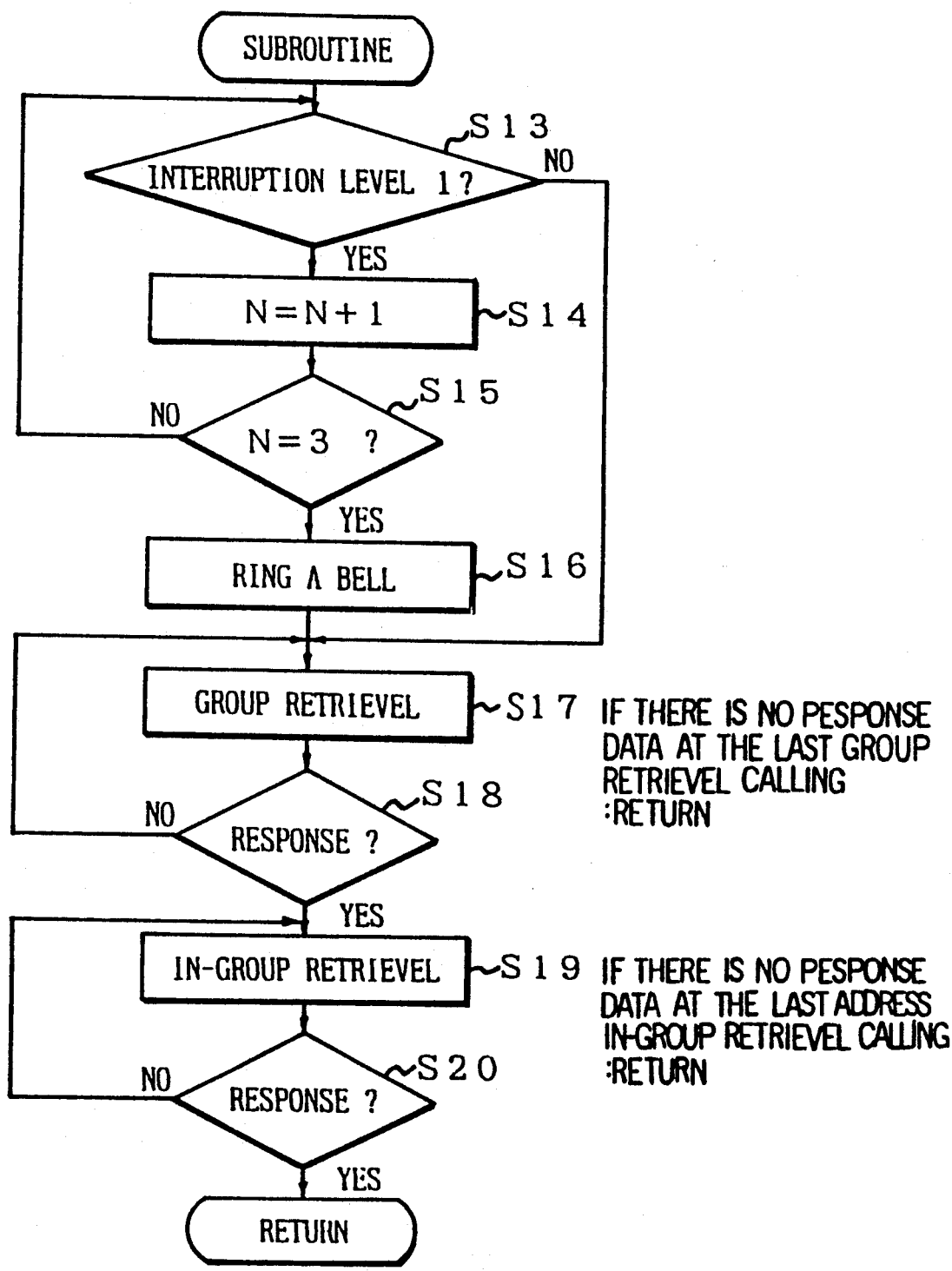
FIG. 9 is a flowchart showing the interrupt/retrieval routine in FIG. 8 as a subroutine.

In the interrupt/retrieval routine shown in FIG. 9, it is determined in S13 whether or not the interrupt level is 1 which indicates the fire detection output of the fire transmitter. If the interrupt level is 1, the counter N for indicating the number of times the interrupts are confirmed is incremented in S14. In the initial state, N=0. Next, it is determined in S15 whether or not N=3, i.e., whether or not the interrupt level 1 has been detected three times. If the number of times the interrupt level 1 is detected is less then 3, the process returns to S13 and it is determined again whether or not the interrupt response signal has the interrupt level 1. The reason why the determination, whether or not the interrupt level 1 has been detected three times, is carried out in S13 is that if the determination is carried out only one time there is a possibility that the interrupt response signal is a noise as occurring in a transmission path. Therefore high reliability of the data is held by the three times checking.

If the interrupt level 1 has been detected three time, the process goes from S15 and S16 and fire alarms are activated. Thereafter, the group retrieval is conducted in S17.

Figure 10:
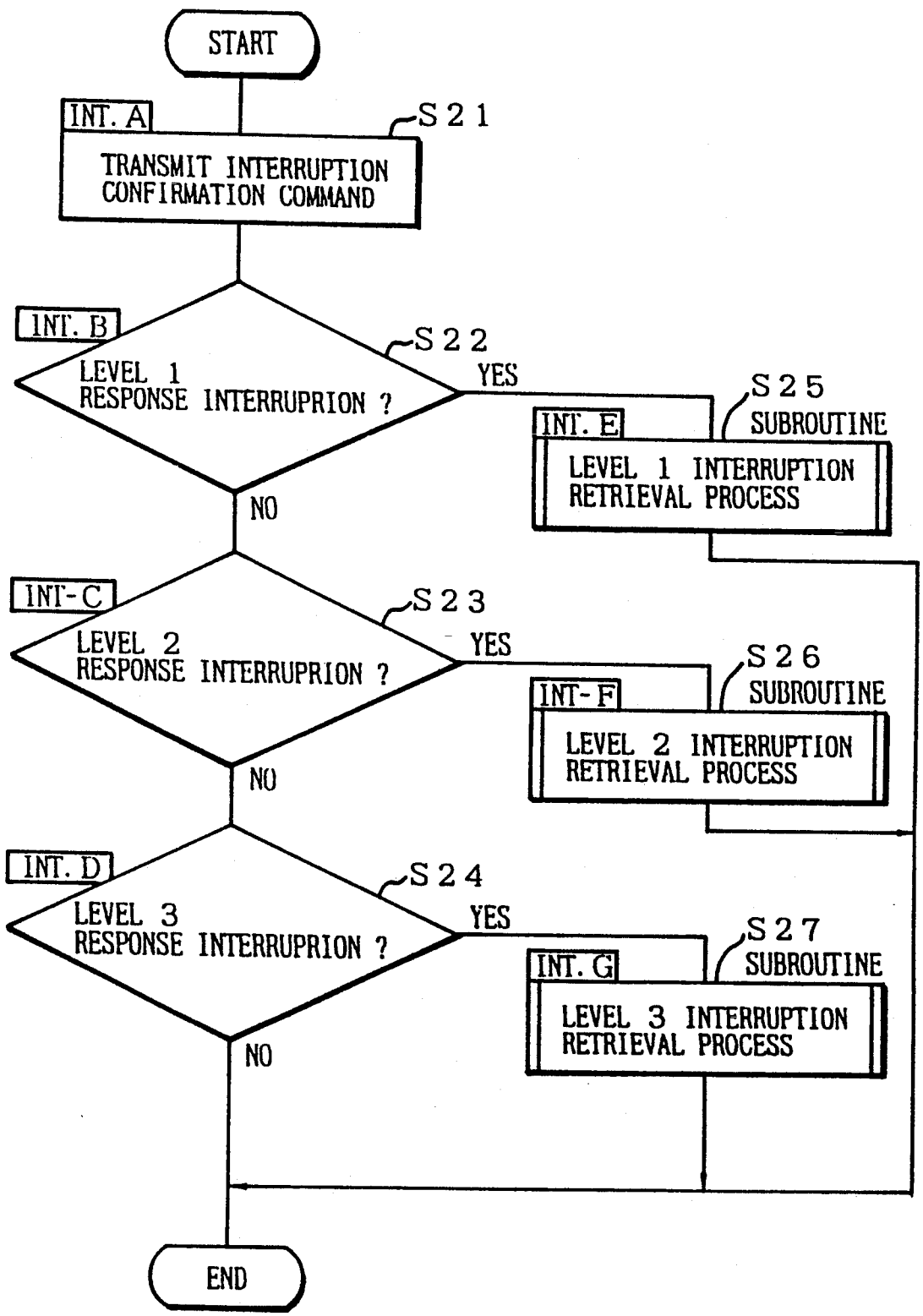
FIG. 10 is a flowchart showing the interrupt level confirmation process and the group calling process at each interrupt level.

If it is determined in S13 that the interrupt response signal has an interrupt level other than 1, the process steps over to S17 and group retrieval is executed. FIG. 10 shows the processings executed in this interrupt level confirmation operation. That is, the interrupt confirmation command is transmitted in S21, and then it is determined in S22 whether or not the response interrupt having the interrupt level 1 is received. If the response interrupt having the interrupt level 1 is received, the retrieval process at the interrupt level 1 is executed (S25). If the response interrupt received has the interrupt level 2, the retrieval process at the interrupt level 2, which is similar to the retrieval process at the interrupt level 1, is executed (S26). The retrieval process at the interrupt level 3 is similarly executed through S24 and S27. If there is no response to the calling of the last group address in the group retrieval S17 the process returns to the main routine shown in FIG. 8. And if there is no response to the calling of the last separate address in the in-group retrieval S19 the process returns to the main routine shown in FIG. 8.

Figure 11:
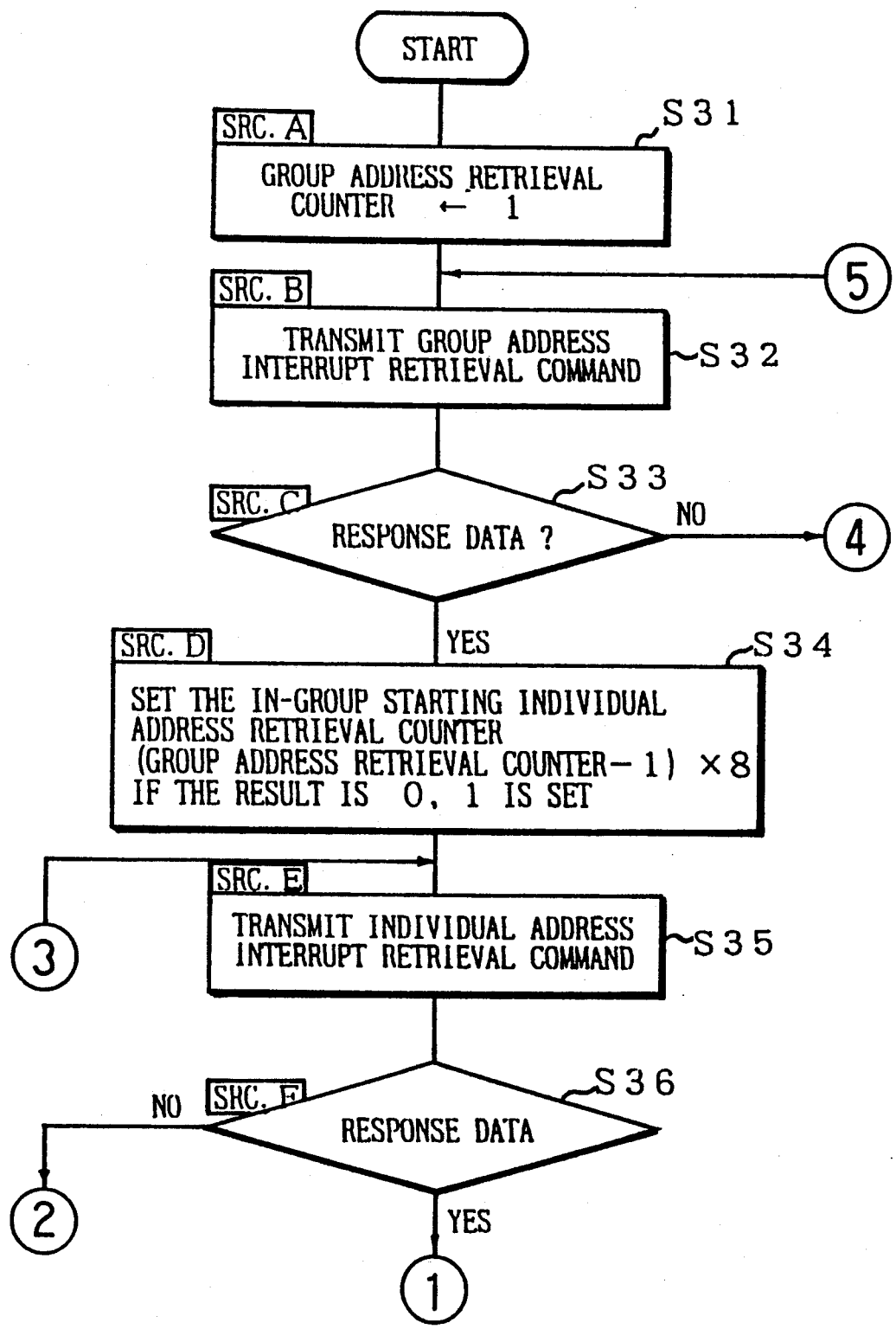
FIGS. 11(A) and 11(B) are flowcharts showing the group and separate address retrieval processes.
Figure 11:
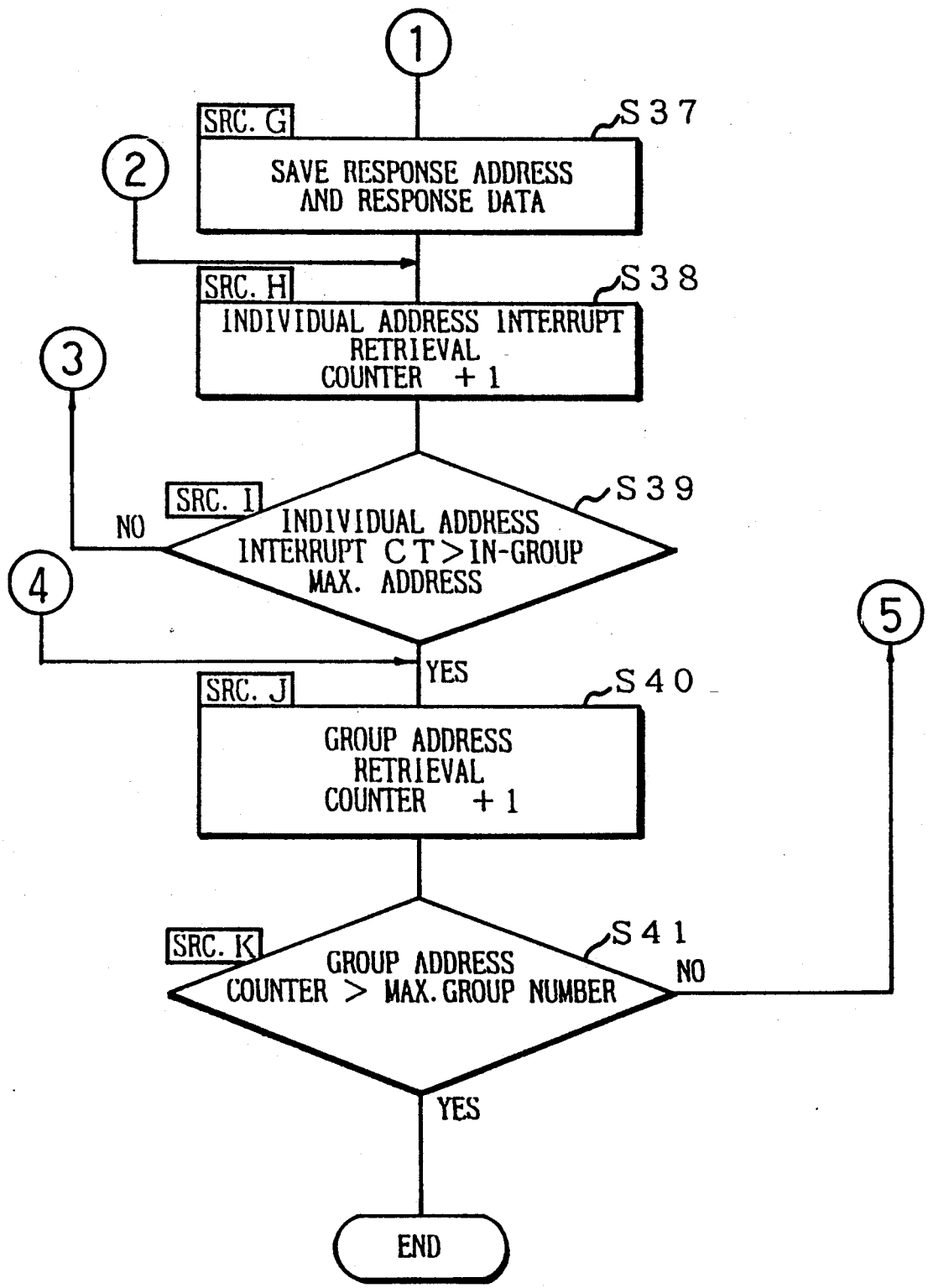

The group and separate address retrieval processings at each interrupt level will be described with reference to FIGS. 9 and 11(A) (B). In the subroutine shown in FIG. 9, the terminals are divided into groups each having a predetermined number of terminals, and group retrieval is executed on such groups. Therefore, the group address is updated in S17, and presence of the group response is checked in S18. If there is a response to the designated group address in S18, retrieval of the terminal in the specified group is executed in S19 to specify the terminal. If there is a response in S20, the terminal in which a fire is detected can be specified. Thereafter, the process returns to the main routine shown in FIG. 8 and the fire generated site is displayed. FIGS. 11(A) (B) is a flowchart of the processings executed in the subroutines of S25, S26 and S27 in FIG. 10 and detailed description of the processings executed in S17, S18, S19 and S10 in FIG. 9. The group and separate address retrieval processes are executed in accordance with the procedures of this flowchart.

In FIGS. 11(A) (B), 1 is set to the counter for the group address retrieval in S31. Next, the group address retrieval command is transmitted in S32, that is, the group 1 is requested to respond to the inquiry about the presence of a terminal in which an abnormality is detected in the group 1. It is thus determined in S33 whether or not response data is received. If no response data is received, the counter is incremented in S40, and then it is determined in S41 whether or not the counter is larger than the maximum group number. If the counter is less than the maximum group number, the process returns to S32, and a subsequent group is retrieved. If the counter is equal to the maximum group number, the group address retrieval process at this interrupt level is completed.

If it is determined in S33 that the response data is received from the relevant group, the separate address retrieval is executed. As in the case of the group address retrieval process, response of each terminal in the group is requested, i.e., the terminal in the group in which an abnormality is detected is specified, by incrementing the counter in the separate address retrieval process. In S34, the starting separate address in the group is set in the counter for the separate address retrieval. At this time, the group 1 comprises the terminal 1-7 and after the group 2 comprises eight terminals (group 1: 1-7, group 2: 8-15, group 3: 16-23 ...). Therefore the value set in the counter is obtained by deducting 1 from the value set in the group address retrieval counter (S31) and by multiplying the resultant value by 8. If the obtained value is 0, 1 is set in the counter. When the value is set in the counter in S34, the separate address retrieval command is transmitted in S35. Thereafter, it is determined in step 36 whether or not a response data is received. If there is a response data, the address and the received response data are recorded (S37). If no response data is received or when the address or the like is recorded in S37, the counter is incremented in S38. Thereafter, the value set in the counter is compared with the maximum address in the group in S39. If the value set in the counter is less than the maximum address, a subsequent value, i.e., a terminal having the subsequent separate address, is retrieved (S39). If the value set in the counter is equal to the maximum address, the separate address retrieval is completed, and the process goes to S40 to execute retrieval on a subsequent group.

To execute the aforementioned group and separate address retrieval processes, a retrieval command is set in the upper 4 bits in the command field shown in FIG. 4. In the lower 4 bits in the command field is disposed a binary code which indicates the contents of the retrieval command, e.g., "0000" in the case of the group address retrieval at the interrupt level 1 or "0011" in the case of the separate address retrieval at the interrupt level 1.

Figure 12A:
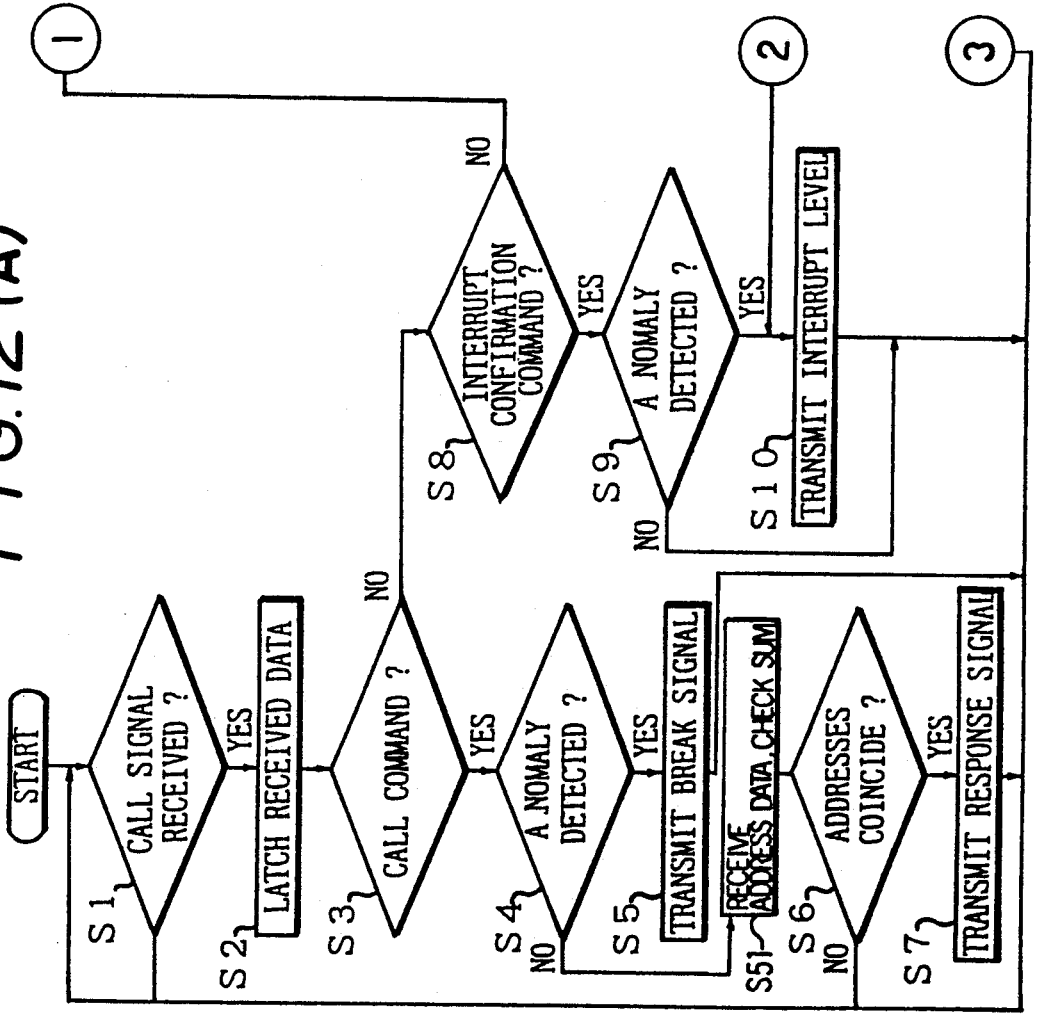

The control processings executed by the terminal shown in FIG. 2 will be described with reference to FIGS. 12(A) (B). In FIG. 12(A) (B), it is determined first in S1 whether or not there is a calling signal from the receiver. If the calling signal is received, the received data is latched in the data buffer in S2, and then it is determined in S3 whether or not the received data is the calling command. If the received data is the calling command, it is determined in S4 whether or not an abnormality, such as a fire, is detected. If the abnormality is detected, an interrupt signal is transmitted to the receiver in S5. If the abnormality is not detected in S4 the calling address data and check sum data from the receiver are received in S51 and it is determined in S6 whether or not the calling address of the received data coincides with the self address. If they are the same, a response signal is transmitted in S7.

When the interrupt confirmation command is transmitted from the receiver 10 in response to the interrupt signal, the process goes from S3 to S8, and the interrupt confirmation command is confirmed. Thereafter, it is determined in S9 whether or not there is an abnormality. If an abnormality is detected, an interrupt level corresponding to the detection state at that time is transmitted as the interrupt confirmation data in S10.

When the retrieval command and the group address for group calling are sent from the receiver 10 in response to the interrupt level, the process goes from S8 to S11, and the retrieval command is confirmed. Thereafter, it is determined in S12 whether or not an abnormality is detected. If an abnormality is detected, it is determined in S13 whether or not the group address in the calling signal coincides with the group address. If they coincide with each other, the interrupt level data same as S10 is transmitted as a group response signal. When the receiver 10 sends out a retrieval command in which a terminal address in the specified group is separately set in response to the response signal, it is determined in S14 that the received retrieval command is an in-group individual address retrieval command, and then it is determined in S15 whether or not an abnormality is detected. If an abnormality is detected, collation of the address is performed in S16. If it is determined S16 that the separate address in the calling signal is the same as the separate address of the relevant terminal, a response signal is transmitted in S17. The receiving end thus specifies the terminal in which an abnormality is detected.

In the aforementioned embodiment, interrupt levels 1 to 3 are used as the interrupt confirmation data. However, adequate data indicating the causes of interrupts can be transmitted as the interrupt confirmation data.

Furthermore, when the interrupt level 1, indicating the fire detection output of the fire transmitter, has been received three times, fire alarms are activated. However, fire alarms may be activated when the interrupt level 1 is received once or at least twice.

What is claimed is:

1. An anti-disaster monitoring system comprising a plurality of terminals each having an address; a transmission path providing a signal path to said terminals; receiver means connected to said terminals through said transmission path for calling said terminals in sequence by transmitting calling signals each of which designates an address of an associated terminal, said terminals including means for transmitting a terminal response signal when the calling address coincides with an address of a terminal, said receiver including means for decoding the received terminal response signal and issuing an alarm; said terminals having an interrupt transmitting section for transmitting an interrupt signal at a predetermined time during said receiver's transmission of the calling signal when an abnormality is detected, and said receiver having an interrupt detection section for monitoring the predetermined time during the transmission of the calling signal to detect an interrupt signal from the terminal; and a calling control means for sequentially performing terminal group calling when the interrupt detection output is obtained from said interrupt signal detection section to specify the terminal in which abnormality data is detected.

2. The anti-disaster monitoring system according to claim 1, wherein said receiver means includes means for transmitting a calling signal for interrupt confirmation to said terminals when said receiver means receives the interrupt detection output of said interrupt detection section to allow a terminal to transmit an interrupt response signal which indicates the cause of generation of the interrupt.

3. The anti-disaster monitoring system according to claim 1, wherein said receiver means transmits the calling signals in a voltage mode, and said terminals transmit the terminal response signals in a current mode.

* * * * *